March 14, 1967  D. R. RHODE  3,308,890

BEET BLOCKING APPARATUS

Filed Aug. 17, 1964  2 Sheets-Sheet 1

INVENTOR.
DAN R. RHODE

BY Tuck & Cole

ATTORNEYS

March 14, 1967 D. R. RHODE 3,308,890
BEET BLOCKING APPARATUS
Filed Aug. 17, 1964 2 Sheets-Sheet 2
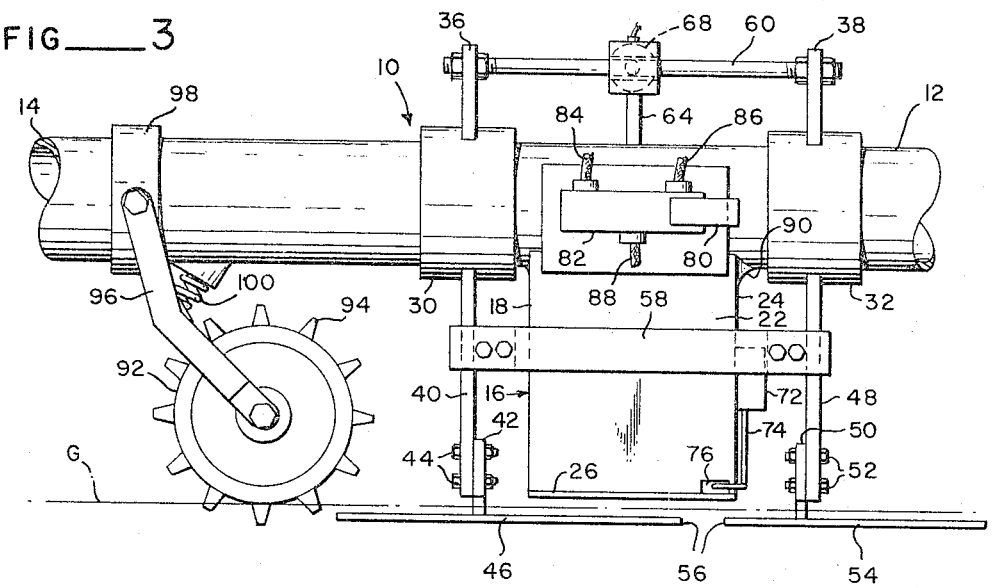
FIG__3
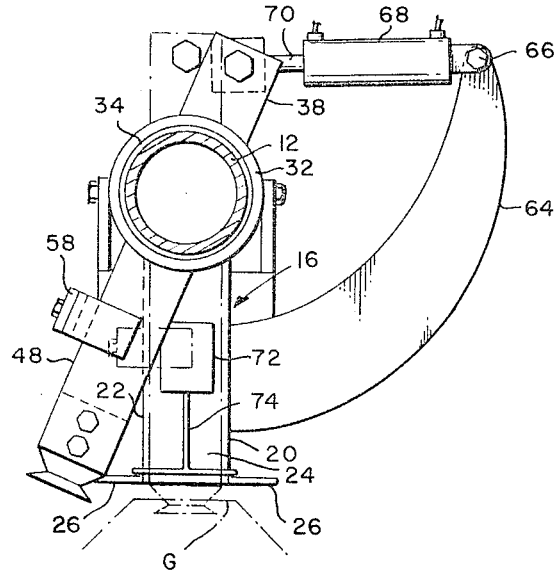
FIG__4
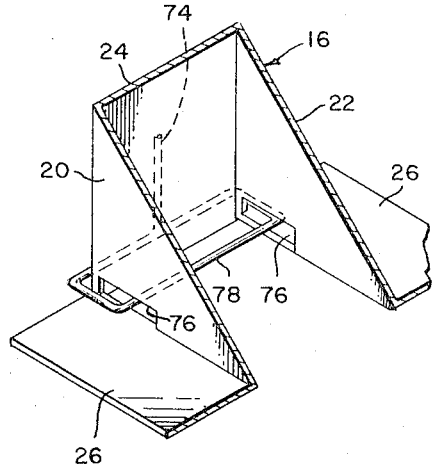
FIG__5
DAN R. RHODE
*INVENTOR.*
BY Tuck & Cole
*ATTORNEYS*

United States Patent Office 3,308,890
Patented Mar. 14, 1967

3,308,890
BEET BLOCKING APPARATUS
Dan R. Rhode, Rte. 2, Box 429,
Toppenish, Wash. 98948
Filed Aug. 17, 1964, Ser. No. 389,839
3 Claims. (Cl. 172—6)

This invention relates to agricultural machines used to thin or block sugar beets or other row crops and plants. More particularly does this invention relate to a thinning device which thins or blocks sugar beets, lettuce, or other row crops and which is mountable either singly or in multiple installations on common agricultural utility equipment, such as tractors.

Heretofore known attempts to provide a practical sugar beet thinning or blocking device have been largely unsuccessful for a number of reasons. The primary disadvantage or defect of prior art devices has been their inability to block on both sides of a single plant with any degree of accuracy. In effect, the devices were not dependable in locating or isolating a plant, and hence a grower was not certain of having a row with plants uniformly spaced from each other at prescribed distances. The nature of the prior art machines was such as to leave large gaps in a row and to permit plants to remain in what should have been a prescribed spacing. Thus, their failure to perform the required function, in addition to the fact that many of these devices were unduly complicated, militated against their adoption and use by the sugar beet and other row crop industries.

The instant invention has overcome the problem of blocking accuracy and positive plant identification with a unique combination of elements. Essentially, this thinning device comprises a header or manifold, preferably cylindrical in shape, which is supported in such a manner that the header or manifold is moved axially or longitudinally over the row of plants in a spaced relation above the row. An open suction housing depends from the underside of the header downwardly to terminate a short distance above the ground line or surface of the row level. The lower rear of the suction housing has a trip mechanism designed to engage individual plants as suction, applied to the housing through the header, causes the leaves to be raised within the said housing, bringing the plant erect, rigid and in a very compact column to facilitate a very precise location for knives to isolate; cut away plants go up and through the housing. Both rearwardly and forwardly of the trip mechanism and spaced endwise from each other, are two blocking knives which swing or pivot in a limited arc on the header just below the lower open end of the housing. The blocking or thinning knives are supported on arms which in turn are supported on sleeves rotatively received on the header. On the upper side of the sleeves are actuating levers connected to a drive source such as a cylinder and piston for swinging the knife arm and the knives themselves through their desired arc. The cylinder may be supported in any manner, and a number of cylinder-supporting structures can be easily devised. The lower end of the suction housing is furnished with a microswitch and wire tripping mechanism located approximately above the space or gap between the cutter knives. In addition, an air valve for controlling the cylinder piston which operates the knives is located on the assembly and the air valve, in turn, is actuated by a solenoid connected to the microswitch. The forward portion of the header may, if desired, be provided with a leveling and packing roller for smoothing out the row ahead of the thinning device. A blower fan of sufficient size to create vacuum or suction through the header and housing is provided, as well as an adjustable air-venting means on the forward end of the header to aid in regulating the amount of vacuum in the housing.

Accordingly, it is a feature of this invention to provide a sugar beet thinning or blocking device which is simple in design, rugged in construction, and economical to produce.

Another feature of this invention is to provide a sugar beet blocking device which eliminates hand-blocking or thinning of sugar beets, lettuce, and other row crops, thus reducing time and expense involved in the thinning operation.

Still another feature of this invention is to provide a sugar beet blocking and thinning device which is simple enough so that a multiple number of the devices can be installed on an appropriate frame-supporting structure mounted on a utility tractor or other suitable farm vehicle.

Yet another feature of this invention is to provide a beet blocking apparatus which locates individual beet plants with great accuracy and which blocks or thins on either side of said plant with precision.

A further feature of this invention is to provide a beet thinning or blocking apparatus which is compact and capable of being operated by power supplied from the tractor or vehicle to which the blocker device is attached.

These, together with other objects, features, and advantages which will become subsequently apparent, reside in the details of construction and operation as more fully hereinafter described and claimed. Reference will be had to the accompanying drawings, forming a part of this disclosure, wherein like numerals refer to like parts throughout, and in which:

FIGURE 3 is a side elevational view of the side opposite that pictured in FIGURE 2;

FIGURE 4 is an end elevational view showing the cutter knives in a normal position at the end of the arc through which they are pivoted; and FIGURE 5 is a partial view in perspective showing for clarity, the details of the trip mechanism attached to the vacuum housing.

Figure 1:
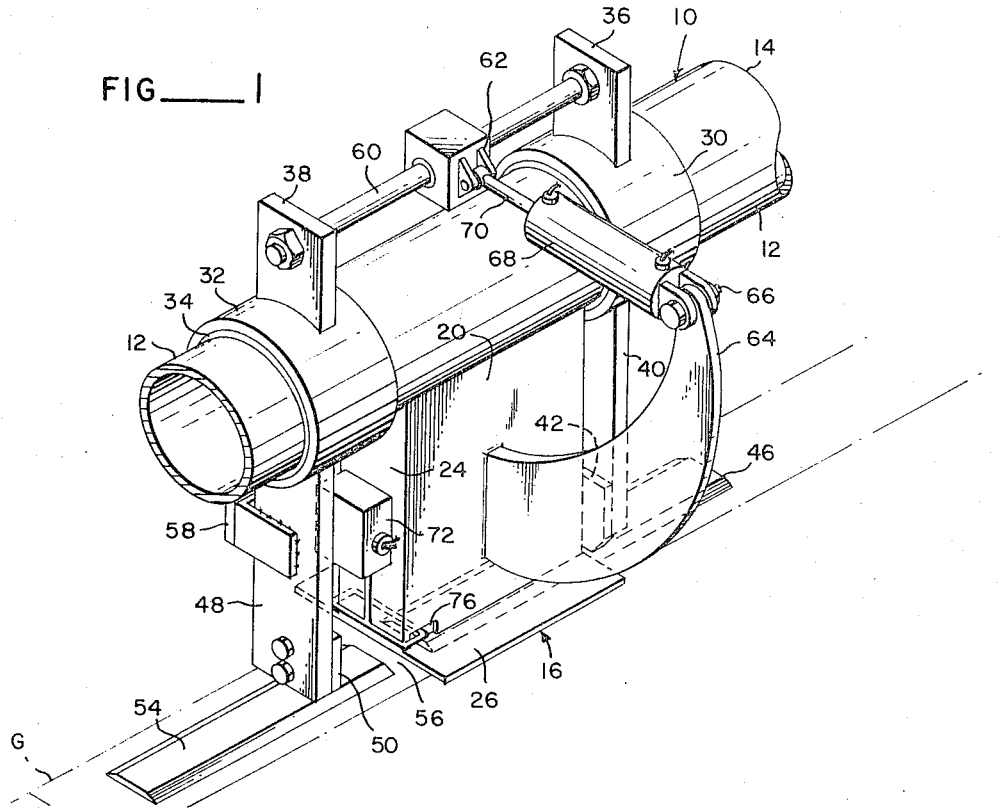
FIGURE 1 is a view in perspective showing the general arrangement of parts and other details of the invention.
Figure 2:
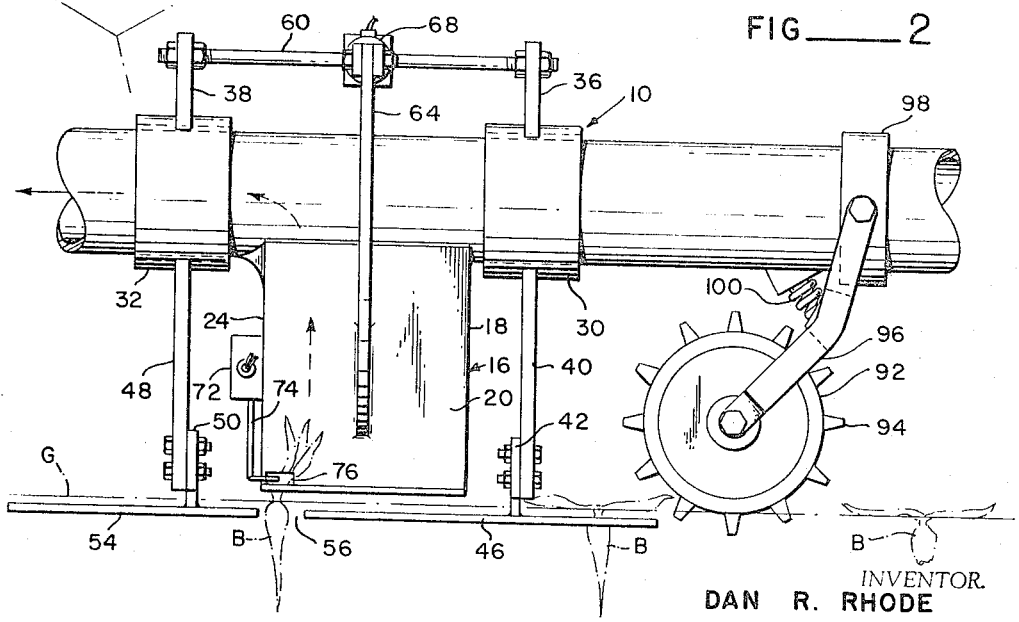
FIGURE 2 is a side elevational view of the device of FIGURE 1 further illustrating details of the invention.

Referring now to the drawings, it will be seen that the sugar beet thinning or blocking device, generally designated by the number 10, is comprised of an elongated, tubular header or manifold member 12 which for the purposes of the illustration, has shown to be round in configuration. Header or manifold 12 in this instance is a member approximately and preferably three inches in diameter, constituting the primary support structure for the elements of this blocking device. Header 12 has a forward end 14 which will be provided with a gate or damper valve to aid in the regulation of air flow through the suction housing. That portion of header 12 to the rear of the blocking element has been cut off for the purposes of simplifying the presentation of the invention. However, the header will lead to a fan or blower mounted somewhere rearwardly of each blocking machine, which also of course, will be driven by power from the tractor. A header or multiples thereof will be supported on framework suspended from the tractor or vehicle. It is contemplated that three and perhaps as many as six of the headers and blocking devices spaced from each other in side-by-side relationship to coincide with the distance between rows will be used for simultaneous multiple-row blocking and thinning. The manner of supporting the header or headers upon the tractor is not considered to be essential to an understanding of the invention; nor is the precise location of the blower or fan situated to the rear of the blocking device or devices and into which each header 12 is directed. As a practical matter, it is contemplated that the fan or blower may receive several headers.

Depending from the underside of header 12 is a suction spout or housing generally referred to by number 16. The suction housing is a depending open rectangular element having a front or forward wall 18, side walls 20 and 22, and rear wall 24. As mentioned, the upper end of suction housing 16 is attached to the header 12. The lower end of said housing is open and has generally horizontally disposed flanges or air deflectors 26 extending outwardly from the side walls over the entire length of the lower end edges of said side walls. For purposes only of placing the invention in a proper perspective, it can be mentioned that housing 16 is approximately four inches long from front to rear, approximately two inches wide across the front and back walls, and perhaps five and one-half inches deep from the lowermost point of header 12 to the bottom opening or lower edge.

Disposed on either side of housing 16 is forward sleeve 30 and rearward sleeve 32. The sleeves are rotatably supported on appropriate journals or bearings 34 as shown in FIGURES 1 and 4. Sleeves 30 and 32 in turn have on the upper side thereof, actuating arms 36 and 38 respectively. Secured to the underside of the forward sleeve is forward cutter arm 40 extending down parallel to and in spaced relationship to the forward end wall 18 of housing 16. The arm terminates generally at about the same level as the lower end of said housing 16. A blade adjustment arm 42 is supported by bolts 44 and connected for depth adjustment to the cutter arm 40. Blade arm 42 has connected to the lower end thereof the horizontally disposed cutter blade 46. Likewise, rear sleeve 32 has depending rear cutter arm 48 with adjustment arm 50 connected thereto at the lower end by bolts 52. Cutter arm 48 and adjustment arm 50 in turn support the rear blade 54. The rear end of forward blade 46 and the forward end of rear blade 54 are spaced apart a predetermined distance to form a plant gap 56 which, as can be seen by reference to the drawings, is generally below that portion of housing 16 below the rear inside surface of wall 24. Note that the blades 46 and 54 are designed or positioned to cut under the ground line indicated by G and thus pass below housing 16. It will be appreciated that dimensions of the blades may be changed and are rendered here only for purposes of illustration. Generally blades 46 and 54 will be approximately five and one-half to six inches in length and approximately ¾ of an inch wide and made of flat strip metal material. Gap 56 between the blades may vary, but normally it will be in the range of about ¼ to ⅜ inch. Flanges 26 on the housing will also be about ¾ of an inch wide. Cutter arms 40 and 48 are shown to be interconnected by a detachable tie bracket 58 since it may not be desired to move the blades together. The actuating arms 36 and 38 on the upper sides of the sleeves are interconnected by an actuating rod 60 which also may be detached or removed if it is desired to pivot the blades individually. A conventional pivot assembly 62 is provided midway between the actuating arms. Cylinder support arm 64 is shown to be connected to side 20 of the suction housing and to have a pivotal connection 66 at the upper end thereof for pivotally supporting cylinder 68. Cylinder 68 in turn has piston rod 70 pivotally received at connection 62 on actuating bar 60. It is to be pointed out that the particular structural support shown for the cylinder is illustrative only. Those skilled in the art will readily devise numerous ways to mount the cylinders on the invention.

The tripping device for instituting movement of blades 46 and 54 is comprised of a microswitch mechanism 72 mounted on the rear wall 24 of the suction housing. Microswitch 72 has depending therefrom an actuating lever 74 which extends downwardly towards the lower edge or open end of said suction housing. Horizontally disposed and elongated slots 76 are formed in the opposed side walls 20 and 22 to accommodate the rectangular trip wire 78 which, as can be seen, extends across the bottom of the housing to the outside of each of slots 76. The wire 78 is formed to extend rearwardly and then bent to joint actuating lever 74. Microswitch 72, when actuated, in turn is responsible for activating solenoid 80 shown in FIGURE 3. Solenoid 80 in turn operates an air valve 82 for directing air through line 84 or line 86 to extend and retract piston 70 and cylinder 68. An air input supply line 88 is also shown to lead to air valve 82. In order to allow for as smooth an air flow as possible, the upper rear corner junction of suction housing 16 and header 12 is provided with a rounded or curving intersection 90 also best shown in FIGURE 3. While such feature is not essential to an understanding of this invention, a packing and smoothing roller 92 having lugs 94 may be provided forwardly of the blocking elements in order that the ground or row line G may be smoothed and prepared. The wheel 92 is supported on pivotal arms 96 which in turn are mounted on detachably collar 98.

It will be appreciated that in operation a properly designed frame may hold several thinning and blocking devices at the required intervals of 22 inches spacing in order to coincide with conventional spacing of sugar beet rows. A blower fan is provided to the rear of the blocking devices so as to receive one or more headers 12 for creating suction therein. Knife lengths, cutter arm lengths, extent of stroke, cutter arm pivot, and size and depth of the suction housing are all features which may be adjusted and altered as desired. As seen in FIGURE 4, the full line showing of the cutter arms indicates the side offset or normal position of the knives. When cylinder 68 is actuated, blades 46 and 54 are swung to the other side. The knives have a swing arc of approximately four to five inches. The dash-dot illustration in FIGURE 4 merely shows the blades midway through their swing. As the thinner or blocker proceeds along a row of sugar beets, the suction housing passes over the low-lying, limp leaves of the young beets and the suction created therein by the blower fan pulls the leaves up into said housing. The raised leaves form a loosely defined cone in the suction housing. Suction is created with sufficient force so that as the blocker continues to move forward, the trip wire 78 and the actuating lever 74 for the microswitch 72 engage a plant. As the cutter blades swing from one side to the other side, all plant life, including superfluous beets, weeds, and the like are cut below ground level for a predetermined distance on each side of the particular beet that has been isolated by the trip mechanism. Gap 56, of course, permits the blades to swing past the beet whose leaves were drawn into the suction housing to trip microswitch 72. With the blocking taking place on each side of the beet, the blocking mechanism continues to move forward to the next plant where air suction will again raise the leaves and allow the next properly spaced plant to be isolated. It will be understood that the plant nearest forward blade 46 will be the one which the suction housing draws up to engage trip 78 as the device moves forward along the row. Those skilled in the art will realize that other triping mechanisms such as photoelectric cells and other forms of mechanical trips could be employed. It will also be realized that the blades could be separately actuated and that said blades could be set so as to cut that which trips the mechanism.

The foregoing is considered as illustrative only of the principles of this invention. Numerous modifications and changes will readily occur to those skilled in the art, and hence it is not desired to limit the invention to the precise construction and operation shown and described. Accordingly, all suitable modifications and equivalents may be resorted to which fall within the scope of this invention.

What is claimed is:

1. A row crop thinning machine adapted to be mounted on a tractor, comprising: (a) a tubular header member connected to a blower fan for creating air suction in said header, said header member being adapted to be generally horizontally supported; (b) a depending, generally rectangular suction housing attached to and opening into said header, said suction housing being open at its lower end and said lower end being adapted to be spaced a predetermined distance above the ground line; (c) a plant contacting and trip means located at the lower end of said suction housing for contacting plants drawn into said housing by air suction; (d) a pair of spaced apart mounting means pivotally received on said header one on each side of said suction housing, each of said mounting means including a depending cutter arm and a generally horizontally disposed cutter blade at the lower end of each arm with said blades located below the lower end of said housing, said cutter arms and blades being designed to swing through a limited arc, said blades also being spaced from each other generally below said trip means; and (e) operating means for pivoting said mounting means, said operating means being connected to and operated by said trip means.

2. A row crop thinning and blocking machine adapted to be mounted on a tractor, comprising: (a) an elongated tubular header member connected to a blower fan for creating air suction in said header, said header member being adapted to be generally horizontally supported longitudinally; (b) a depending, generally rectangular suction housing attached to and opening into said header, said suction housing being open at its lower end and said lower end being adapted to be spaced a predetermined distance above the ground line; (c) a plant contacting and trip means located at the lower end of said suction housing for contacting plants drawn into said housing by air suction; (d) a pair of spaced apart mounting means pivotally received on said header one on each side of said suction housing, each of said mounting means including a depending cutter arm and a generally horizontally positioned cutter blade at the lower end of each arm with said blades located below the lower end of said housing, said cutter arms and blades being designed to swing through a limited arc, said blades also being spaced from each other in end-to-end relationship generally below said trip means; and (e) operating means for pivoting said mounting means, said operating means being connected to and operated by said trip means.

3. A row crop thinning and blocking machine adapted to be mounted on a tractor, comprising: (a) a tubular header member connected to a blower fan for creating air suction in said header, said header member being adapted to be generally horizontally supported on said tractor; (b) a depending, generally rectangular suction housing attached to and opening into said header, said suction housing being open at its lower end and said lower end being adapted to be spaced a predetermined distance above the ground line; (c) a plant contacting and trip means located at the lower end of said suction housing for contacting portions of plants drawn into said housing by air suction; (d) a pair of spaced apart mounting means pivotally received on said header one on each side of said suction housing, each of said mounting means including a depending cutter arm and a generally horizontally positioned cutter blade at the lower end of said arm with said blades passing beneath the lower end of said housing, said cutter arms and blades being designed to swing from side to side of said housing through a limited arc, said blades also being spaced from each other generally below said trip means; and (e) operating means for pivoting said mounting means, said operating means being connected to and operated by said trip means.

References Cited by the Examiner
UNITED STATES PATENTS

| 1,347,733 | 7/1920 | Davis | 171—17 X |
| 2,804,004 | 8/1957 | Hubalek et al. | 172—6 |
| 3,023,815 | 3/1962 | Bowman | 172—5 |

ABRAHAM G. STONE, *Primary Examiner.*

WILLIAM A. SMITH III, *Examiner.*